Patented Jan. 12, 1937

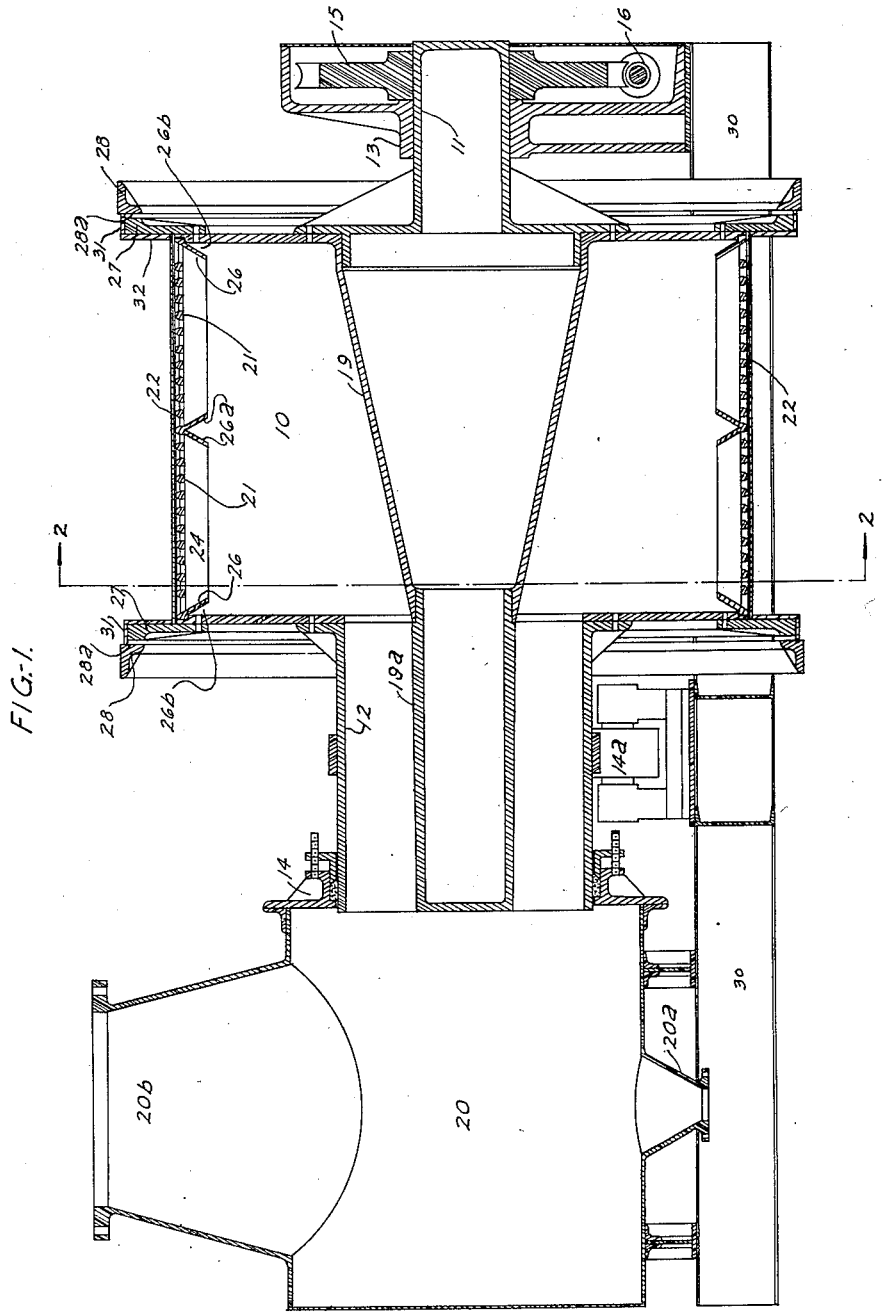

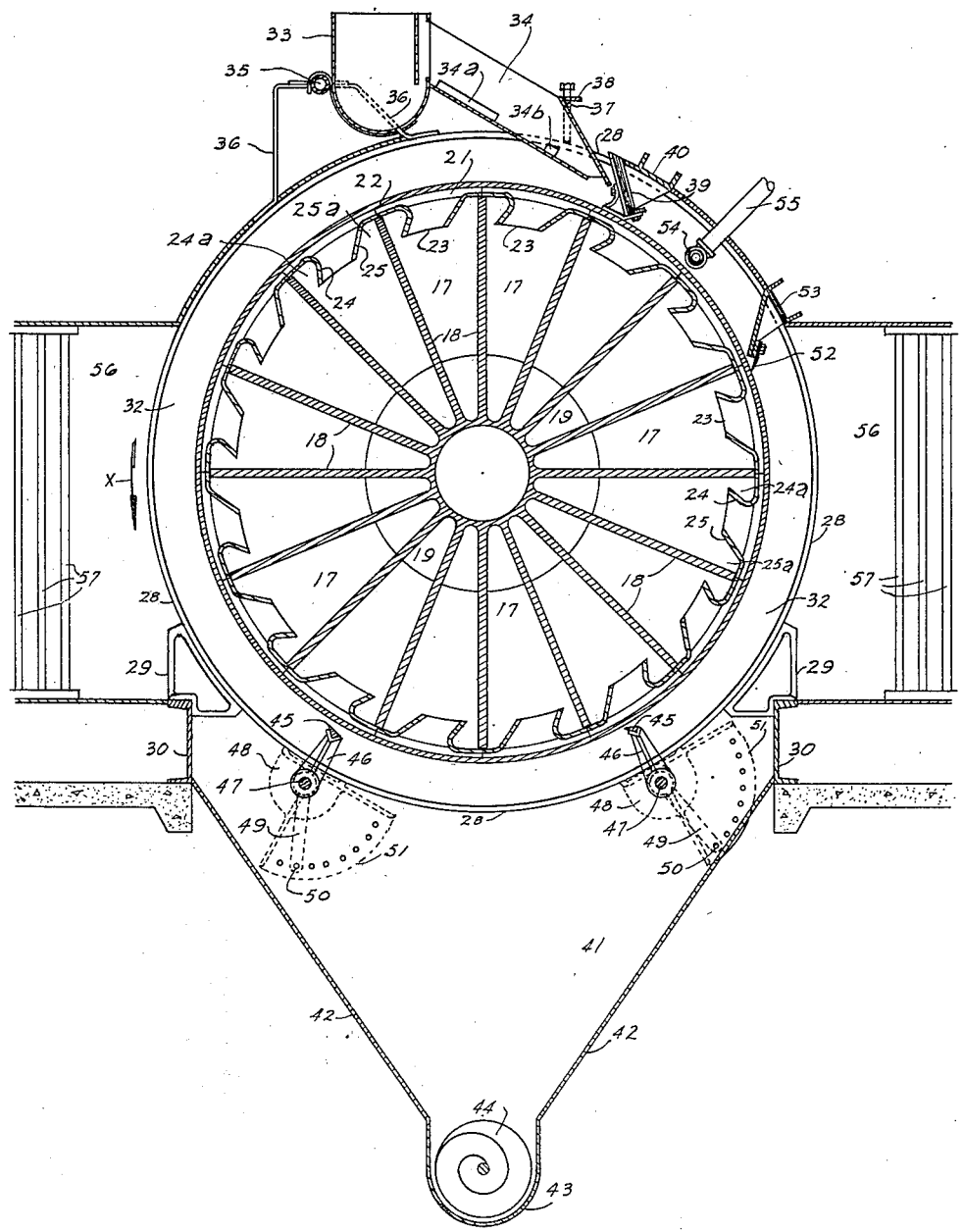

2,067,415

UNITED STATES PATENT OFFICE 2,067,415

CONTINUOUS ROTARY FILTER

Clinton S. Robison, Chicago, Ill., assignor, by mesne assignments, to Oliver United Filters Incorporated, San Francisco, Calif., a corporation of Nevada Application December 14, 1931, Serial No. 580,775

5 Claims. (Cl. 210—201)

This invention relates to improvements in continuous rotary filters or extractors, and consists of the matters hereinafter described and more particularly pointed out in the appended claims.

Extractors or filters of the kind are designed for separating the solids from an aggregate of solids and liquids and in general include a rotary drum, the surface of which is provided with a suitable perforate cover supported by a grid. Upon the cover the aggregate is continuously discharged as the drum is rotated, while a vacuum impressed upon the interior of the drum produces a suction which draws the liquid through the perforate cover into the drum, whence it is discharged, leaving the solid as a coating on the cover. Though the main bulk of the liquid is easily withdrawn from the drum, a small amount collects or is entrained on the interior walls of the drum and difficulty has been heretofore encountered in preventing this liquid from draining back through the grid and cover to wet or dampen the already dried cake of the solids.

An object of my invention is to provide in a continuous filter or extractor of the kind, devices in the drum so designed and arranged that the liquid which collects on the walls of the drum will be blocked or pocketed when it flows towards the surface of the drum and will thus be prevented from flowing to and through the cover to again wet the already dried solids in any position of the drum.

This and other objects and advantages of the invention will be pointed out more fully as I proceed with my specification.

In the drawings:—

Figure 1 is a view representing a longitudinal central section through a filter or extractor in which is embodied my invention,—with the feed trough eliminated.

Figure 2 is a view representing a vertical section through the drum of the apparatus taken on the line 2—2 of Figure 1.

Referring now to that embodiment of my invention illustrated in the drawings:—10 indicates a hollow rotary drum. Said drum is of any familiar construction and is provided with hollow end trunnions 11 and 12 which are rotatively mounted in suitably supported bearings 13, 14a. The bearing 14a for the trunnion 12 is, as shown, a roller bearing. A worm wheel 15 fixed to the end of the trunnion 11 is driven by a worm 16 to impart a slow rotative movement to the drum.

The drum is divided into a plurality of radially disposed, longitudinally extending compartments 17 by means of angularly spaced, radial walls 18. Said walls are made rigid at their inner ends with a hollow conical hub 19 extending from the neighborhood of the trunnion 11 where the larger part of the cone is located, to the other trunnion 12 through which it is continued by a substantially cylindrical part 19a. The space surrounding the part of the hub 19a and located within the hollow trunnion 12 is open at one end to the radial compartments provided in the drum. Said compartments are extended through the trunnion 12 and open into a casing 20, provided at its bottom with a discharge 20a for the liquid and having a connection at 20b to the fan or blower (not shown) by which a vacuum is produced in the compartments 17 of the drum. The trunnion 12 is connected to the casing 20 by means including a packing gland 14, which provides an airtight joint, but permits rotation of the said trunnion therein.

The cylindrical surface of the drum is provided by a plurality of open grids 21 and a perforate cover 22, there being a grid for each compartment. Each grid is provided with a nozzle 23 which depends into the associated compartment and has an axis of discharge at an angle to a radius of the drum. Said nozzles extend the length of the drum and have side walls 24, 25 and end walls 26 adjacent the ends of the drum. As shown and preferably, said nozzles are made duplex by means of intermediate oppositely inclined adjacent supplemental walls 26a. The walls 24, 25 each extend at an angle to the adjacent radial wall of the compartment and provide pockets 24a, 25a, in the neighborhood of the cover of the drum adjacent each of the radial walls of said compartments. The end walls 26 adjacent the end walls of the drum are directed at an angle thereto providing pockets 26b adjacent said end walls. The direction of rotation of the drum as shown herein is indicated by the arrow X and the walls 24, 25 of the nozzles 23 are inclined in that direction.

The drum has fixed to its ends circular plates 27, 27 which extend radially beyond the cover 22. Arcs or rings 28 having flat faces 28a are supported adjacent the ends of the drum, being carried by suitable beams 29 supported on channels 30 in any familiar manner. Circular bands 31 fixed on the peripheries of the circular plates 27 project endwise of the drum beyond the plates 27 and are closely engaged against the flat faces 28a of the arcs 28. Circular plates 32 are fixed to the inner radially projecting faces of the circular plates 27 and close at their inner edges on the cover 22.

The aggregate of liquid and solid is fed to the surface of the drum at the top and in the space between the plates 32 from a trough or tank 33 supported above the drum. Said tank has a discharge chute 34 preferably directed away from the direction of rotation of the drum. The tank 33 with its chute 34 are mounted to tilt together on a rod 35 extending in the direction of the length of the drum and parallel to its axis of rotation and mounted on brackets 36 rising from the arcs or rings 28. Bolts 37 threaded through the ends of a bar 38 extending transversely of the end of the chute and projecting beyond the same engage the peripheries of the arcs or rings 28. By this means the tank and chute may be tilted on the rod 35 to regulate the flow of the aggregate of liquid and solid to the surface of the drum.

39 indicates a dam located in the neighborhood of the discharge end of the chute 34. Said dam may be of any suitable construction and extends the length of the drum and between the plates 32, closely engaging the cover 22 on its bottom and closely engaging the plates 32 at its ends so as to completely block the flow of any liquid of the aggregate discharged on the cover. Said dam is mounted on suitable brackets 40 supported on the arcs or rings 28.

Below the drum and extending the length thereof is a hopper 41 into which the dried solid falls as it is removed from the cover. Said hopper has downwardly converging side walls 42 which direct the solid material into a semi-cylindrical bottom 43 containing a conveyor 44 of any suitable or familiar construction for carrying away the dried material to a place of disposal.

In the operation of the filter or extractor, a cake of the solids of a thickness depending upon the rate of feed of the aggregate to the drum in proportion to the rate of rotation of the drum, collects on the cover 22, more and more moisture being extracted from said cake as it passes from a position below the chute 34 towards the lower part of the drum. The outer thickness of this cake may and generally does dry out more quickly than that next adjacent to the cover. I, therefore, preferably provide scrapers 45, 45 each designed to remove a predetermined thickness of the cake. Each scraper extends the length of the drum and is carried by suitable arms 46 fixed to a longitudinally extending rod 47 suitably mounted to rock in brackets 48 carried on the arcs or rings 28. By means of an arm 49 carrying a pin 50 adapted to engage in arcuately disposed holes or openings in the plate 51, either scraper 45 may be adjusted to varying distances from the cover so as to remove the desired thickness of the cake.

A final scraper 52 carried on brackets 53 attached to the arcs or rings 28 is located somewhat to the rear of the baffle or dam 39. This scraper, being designed to remove the last bit of solid that clings to the cover, engages the cover closely.

Between the dam or baffle 39 and the final scraper 52 is located a shower pipe 54 extending longitudinally of the drum in close proximity to the cover. It is supplied with water through a pipe 55 from any suitable source of supply and is designed to thoroughly clean and finally remove any solid matter that adheres to the cover after it has passed the final scraper 52.

At the sides of the drum are located housings 56 containing heater pipes 57 for supplying hot air, if desired, to hasten the drying operation of the cake.

The liquid drawn through the cover 22 by the pull of the vacuum in the drum, will flow through the grids 21 to one or the other of adjacent compartments 17 through their respective discharge nozzles 23. The greater part of this liquid will flow down to the center of the drum and will be directed by its conical hub 19 through the hollow trunnion 12 and thence to the casing or receiver 20 from which it will escape through the outlet 20a. A part of the liquid, however, will be entrained upon the walls of the compartments 17 and as those walls pass from the substantially upright positions they occupy when passing under the chute, to and through the downwardly inclined positions they assume successively as each passes through a horizontal plane, this entrained liquid will run back down said walls towards the cover. Instead of reaching the cover, however, to dampen the cake which has been already partially dried or dried, said liquid is trapped in the pockets 24a, 25a and 26b in which it is retained until each compartment has passed the location of the final scraper 52. The angles of the side walls 24, 25 of the nozzles 23 are so designed that said side walls will not pass through a horizontal position until after they have passed said scraper 52, as is clearly apparent from an examination of Figure 2. It will also be observed that by reason of the pockets 26b at the ends of the nozzles 23 the pockets 24a and 25a are connected so that if more liquid should collect in one part of either pocket, an interflow between the two is possible in order to bring the liquid to a common level therein.

The chute 34 is provided at the bottom with strips 34a, 34b disposed in such manner as to spread the aggregate of the liquid and solid as it flows out the chute evenly throughout the entire extent of the same in the direction of the length of the drum.

The perforate cover 22 may be made of any suitable material, depending upon the nature of the aggregate from which the liquid is to be extracted, as canvas, fine mesh wire, or any other perforate material best suited to the purpose.

I claim as my invention:—

1. In a vacuum extractor, in combination with a rotary drum having radially extending flanges at its ends, a trough having a discharge chute movable therewith, said trough and chute being mounted to tip on an axis parallel to the axis of said drum, and means for tipping said trough and chute.

2. In a vacuum extractor, in combination with a rotary drum having radially extending flanges at its ends, a trough having a discharge chute movable therewith, said trough and chute being mounted to tip on an axis parallel to the axis of said drum, means for tipping said trough and chute, and a dam engaged with said drum and extending between said flanges.

3. In a vacuum extractor, a rotary drum; radial walls dividing said drum into a plurality of radially disposed compartments extending lengthwise thereof; means providing extractor cells extending about the periphery of said drum, said means including nozzles severally depending into said compartments and having their axes directed at an angle to said radial walls; said nozzles having side walls running the length of the drum and providing pockets adjacent to said radials walls of the drum.

4. In a vacuum extractor, a rotary drum; radial walls dividing said drum into a plurality of radially disposed compartments extending lengthwise thereof; means providing extractor cells extending about the periphery of said drum; said means including nozzles severally depending into said compartments and having their axes directed at an angle to said radial walls; said nozzles having side walls running the length of the drum and providing pockets adjacent to said radial walls of the drum, and having end walls directed at an angle to the ends of the drum providing supplemental pockets communicating with said first named pockets.

5. In a vacuum extractor, a rotary drum; radial walls dividing said drum into a plurality of radially disposed compartments extending lengthwise thereof; means providing extractor cells extending about the periphery of said drum; said means including nozzles severally depending into said compartments and running lengthwise of the drum; the axes of said nozzles being directed at an angle to said radial walls; said nozzles having side and end walls providing intercommunicating pockets about each nozzle adapted to receive liquid entrained on said radial walls.

CLINTON S. ROBISON.